(12) United States Patent
Elder et al.

(10) Patent No.: US 7,679,314 B2
(45) Date of Patent: Mar. 16, 2010

(54) MULTIPLE BATTERY SYSTEM FOR RELIABLY SUPPLYING ELECTRICAL ENERGY TO AN ELECTRICAL SYSTEM

(75) Inventors: David W. Elder, Coral Springs, FL (US); Frank Bruno, Lake Worth, FL (US)

(73) Assignee: Reserve Power Cell, LLC, Deerfield Beach, FL (US)

( * ) Notice: Subject to any disclaimer, the term of this patent is extended or adjusted under 35 U.S.C. 154(b) by 0 days.

(21) Appl. No.: 12/008,192

(22) Filed: Jan. 9, 2008

(65) Prior Publication Data

US 2008/0111426 A1 May 15, 2008

Related U.S. Application Data

(62) Division of application No. 10/604,703, filed on Aug. 11, 2003, now Pat. No. 7,339,347.

(51) Int. Cl.
*H02J 7/00* (2006.01)
*H02H 7/18* (2006.01)
(52) U.S. Cl. .................. 320/104; 307/10.7; 307/64; 307/66
(58) Field of Classification Search ............... 320/103, 320/104; 307/10.1, 10.6–10.7, 64, 66, 116, 307/125, 130, 131; 429/34–39, 51, 72–73
See application file for complete search history.

(56) References Cited

U.S. PATENT DOCUMENTS 1,588,803 A 6/1926 Owen
3,029,301 A 4/1962 Strider (Continued)

FOREIGN PATENT DOCUMENTS

DE 3502100 A1 7/1986

(Continued)

OTHER PUBLICATIONS

Hardin, J.E., Laboratory Testing of GNB Switch 12 Volt SLI Battery, Mar. 1990, pp. 1-16, U.S. Department of Commerce, National Technical Information Service, Springfield, VA.

(Continued)

*Primary Examiner*—Edward Tso
*Assistant Examiner*—Richard V Muralidar
(74) *Attorney, Agent, or Firm*—Daniel C. Crilly; Kevin P. Crosby; GrayRobinson, P.A.

(57) ABSTRACT

A multiple battery system includes a battery housing, first and second batteries disposed in the battery housing, a one-way charging circuit, and at least one switching device. The battery housing includes at least one positive terminal and at least one negative terminal, which are electrically coupleable to an electrical system. Each battery includes respective positive and negative outputs. The negative output of each battery is electrically connected to the negative terminal(s) of the battery housing. The one-way charging circuit is electrically connected between the positive outputs of the two batteries and is configured to facilitate charging of, but prevent current flow from, the second battery when the first battery is supplying electrical energy to the electrical system. The switching device(s) is operable in at least two states to selectively electrically connect the positive terminal(s) of the battery housing to a selective one of the positive outputs of the two batteries.

21 Claims, 11 Drawing Sheets

U.S. PATENT DOCUMENTS

| | | |
|---|---|---|
| 3,200,014 A | 8/1965 | Roberts |
| 3,475,221 A | 10/1969 | Jordan et al. |
| 3,742,302 A | 6/1973 | Neill |
| 3,758,345 A | 9/1973 | Toth et al. |
| 3,763,415 A | 10/1973 | Ownby |
| 4,041,363 A | 8/1977 | Sheidler |
| 4,082,992 A | 4/1978 | Day |
| 4,090,122 A * | 5/1978 | Hoinski ............... 320/125 |
| 4,157,492 A | 6/1979 | Colbrese |
| 4,239,839 A | 12/1980 | McDowall et al. |
| 4,489,242 A | 12/1984 | Worst |
| 4,516,066 A | 5/1985 | Nowakowski |
| 4,684,580 A | 8/1987 | Cramer |
| 4,746,853 A | 5/1988 | Ingalls |
| 4,869,688 A | 9/1989 | Merio |
| 4,883,728 A | 11/1989 | Witehira |
| 4,924,176 A | 5/1990 | Tremblay |
| 4,949,028 A | 8/1990 | Brune |
| 5,002,840 A | 3/1991 | Klebenow et al. |
| 5,108,848 A | 4/1992 | Kramer |
| 5,154,985 A | 10/1992 | Tanaka |
| 5,157,271 A | 10/1992 | Fujiwara |
| 5,162,164 A | 11/1992 | Dougherty et al. |
| 5,164,273 A | 11/1992 | Szasz et al. |
| 5,169,735 A | 12/1992 | Witehira |
| 5,175,484 A | 12/1992 | Witehira et al. |
| 5,194,799 A | 3/1993 | Tomantschger |
| 5,200,688 A | 4/1993 | Patino et al. |
| 5,204,610 A | 4/1993 | Pierson et al. |
| 5,223,351 A | 6/1993 | Wruck |
| 5,225,761 A | 7/1993 | Albright |
| 5,256,502 A | 10/1993 | Kump |
| 5,264,777 A | 11/1993 | Smead |
| 5,316,868 A | 5/1994 | Dougherty et al. |
| 5,352,966 A | 10/1994 | Irons |
| 5,418,444 A | 5/1995 | Cook et al. |
| 5,448,152 A | 9/1995 | Albright et al. |
| 5,487,956 A | 1/1996 | Bromley et al. |
| 5,496,654 A | 3/1996 | Perkins |
| 5,549,984 A | 8/1996 | Dougherty |
| 5,576,612 A | 11/1996 | Garrett et al. |
| 5,666,040 A | 9/1997 | Bourbeau |
| 5,683,827 A | 11/1997 | Yu |
| 5,694,335 A | 12/1997 | Hollenberg |
| 5,726,553 A | 3/1998 | Waugh |
| 5,767,658 A | 6/1998 | Hayes |
| 5,825,100 A | 10/1998 | Kim |
| 5,838,136 A | 11/1998 | Waugh |
| 5,844,325 A | 12/1998 | Waugh et al. |
| 5,866,274 A | 2/1999 | Mawston et al. |
| 5,907,194 A | 5/1999 | Schenk et al. |
| 5,986,431 A | 11/1999 | Hayes |
| 5,993,983 A | 11/1999 | Rozon |
| 5,995,396 A | 11/1999 | Byrne et al. |
| 6,041,976 A | 3/2000 | Robertson |
| 6,046,514 A | 4/2000 | Rouillard et al. |
| 6,057,666 A | 5/2000 | Dougherty et al. |
| 6,121,750 A | 9/2000 | Hwa et al. |
| 6,172,478 B1 | 1/2001 | Leppo et al. |
| 6,181,100 B1 | 1/2001 | Shoji |
| 6,198,249 B1 | 3/2001 | Kroll et al. |
| 6,222,341 B1 | 4/2001 | Dougherty et al. |
| 6,222,342 B1 | 4/2001 | Eggert et al. |
| 6,229,279 B1 | 5/2001 | Dierker |
| 6,271,642 B1 | 8/2001 | Dougherty et al. |
| 6,275,001 B1 | 8/2001 | Dierker |
| 6,323,608 B1 | 11/2001 | Ozawa |
| 6,377,029 B1 | 4/2002 | Krieger et al. |
| 6,384,573 B1 | 5/2002 | Dunn |
| 6,452,361 B2 | 9/2002 | Dougherty et al. |
| 6,455,951 B1 | 9/2002 | Shultz et al. |
| 6,476,583 B2 | 11/2002 | McAndrews |
| 6,507,169 B1 | 1/2003 | Holtom et al. |
| 6,515,453 B2 | 2/2003 | Feil et al. |
| 6,545,445 B1 | 4/2003 | McDermott et al. |
| 6,577,098 B2 | 6/2003 | Griffey et al. |
| 6,597,150 B1 | 7/2003 | Bertness et al. |
| 6,639,384 B2 | 10/2003 | Hasegawa et al. |
| 6,727,602 B2 | 4/2004 | Olson |
| 6,734,651 B2 | 5/2004 | Cook et al. |
| 6,832,171 B2 | 12/2004 | Barsoukov et al. |
| 6,923,278 B2 | 8/2005 | Shimane et al. |
| 7,042,115 B2 | 5/2006 | Mizutani et al. |
| 7,058,525 B2 | 6/2006 | Bertness et al. |
| 2003/0062773 A1 | 4/2003 | Richter et al. |
| 2004/0078141 A1 | 4/2004 | Kittell et al. |
| 2004/0113589 A1 | 6/2004 | Crisp et al. |
| 2004/0192407 A1 | 9/2004 | Formenti |
| 2006/0284600 A1 | 12/2006 | Verbrugge |
| 2007/0159137 A1 | 7/2007 | Verbrugge et al. |
| 2007/0229032 A1 | 10/2007 | Elder et al. |
| 2007/0285060 A1 | 12/2007 | Zettel et al. |

FOREIGN PATENT DOCUMENTS

| | | |
|---|---|---|
| EP | 1355401 A2 | 10/2003 |
| GB | 2040117 A | 8/1980 |
| GB | 2220112 | 12/1989 |
| GB | 2373648 A | 9/2002 |
| JP | 05068306 A | 3/1993 |
| JP | 2001021974 A | 1/2001 |
| WO | WO 02/42786 A2 | 5/2002 |
| WO | WO 2007/006121 A1 | 1/2007 |

OTHER PUBLICATIONS

Halverson, Richard C., Neon Colors Jazz Up APAA Show 'Spare' Batteries Spark Interest Despite High Prices, Sep. 25, 1989, Discount Store News (via www.findarticles.com).

Unknown, 'Spare' Battery Prices Ease at Discounters, Jan. 29, 1990, Discount Store News (reprinted at www.findarticles.com).

Unknown, Tomorrow's World The Australian Initiative Early Innovations in Transport, http://apc-online.com/twa/history3.html, Associated Publishing Corporation, Apr. 4, 2006.

Pacific Dunlop of Australia, Exide Switch Battery "The others look half as good", Jul. 3, 1989, pp. 1-2.

Machine translation of JP-05068306, Mar. 19, 1993.

Office Action In connection with co-pending, related U.S. Appl. No. 12/149,950 dated May 11, 2009 (12 pages).

Patent Office of the People's Republic of China; Notification and English translation of a First Office Action dated Oct. 10, 2008 in connection with Chinese Application No. 200480026280.8 entitled "Multiple Battery System, Multiple Battery Management System, Auxiliary Battery Attachment System" (5 pages), which Is a Chinese counterpart application to U.S. Appl. No. 10/604,703.

Patent Office of the People's Republic of China; Notification and English translation of a Second Office Action dated May 8, 2009 in connection with Chinese Application No. 200480026280.8 entitled "Multiple Battery System, multiple Battery Management System, Auxiliary Battery Attachment System" (5 pages), which is a Chinese counterpart application to U.S. Appl. No. 10/604,703.

International Search Report and Written Opinion of the International Searching Authority dated Oct. 16, 2009 as entered in International Appl. No. PCT/US09/04853 (10 pages).

* cited by examiner

RUNNING FROM MAIN BATTERY

RUNNING FROM AUXILIARY BATTERY

OFF NO BATTERY CONNECTED

MULTIPLE BATTERY SYSTEM FOR RELIABLY SUPPLYING ELECTRICAL ENERGY TO AN ELECTRICAL SYSTEM

CROSS REFERENCE TO RELATED APPLICATIONS

This application is a division of U.S. application Ser. No. 10/604,703 filed on Aug. 11, 2003, now U.S. Pat. No. 7,339, 347 B2, which application is incorporated herein by this reference as if fully set forth herein, and hereby claims priority upon such application under 35 U.S.C. § 120. This application is also related to U.S. application Ser. No. 12/008,201 filed on Jan. 9, 2008 and to U.S. application Ser. No. 12/008, 195, which is now U.S. Pat. No. 7,427,865 B2.

BACKGROUND OF THE INVENTION

1. Field of the Invention

The present invention relates generally to rechargeable battery systems including a main battery and at least one auxiliary battery, and, more particularly, to a multiple battery system configured to selectively supply electrical energy from one of the main battery and the auxiliary battery to an electrical system to which the multiple battery system is electrically coupled.

2. Description of Related Art

Almost every vehicle utilized today requires a battery to operate. The battery usually initiates an internal combustion reaction that is at the heart of conventional motors. Additionally, with the development of electric and hybrid-electric vehicles that rely directly on batteries to function, there is an increased need for a reliable supply of power from batteries. Recently, significant improvements in battery technologies have allowed conventional-sized batteries to have increased power, increased operating life, better response to discharge and recharge cycling, and lower maintenance requirements than their predecessors. This has allowed for improved starting, as well as prolonged operation of vehicles, equipment, and auxiliary devices.

However, the elements of a conventional battery have changed little, even as many other aspects of vehicle technology and safety have improved. For example, conventional vehicle batteries include a fairly standard sized rectangular casing containing cells (e.g., six cells for twelve-volt batteries and three cells for six-volt batteries). These cells typically contain positive and negative battery plates and electrolytic fluid to allow the battery to store reserve electricity and replenish this reserve from a generating source, such as an electrical system. The battery is typically coupled through a standard set of electrical cables to the electrical system of the vehicle or piece of equipment.

However, a significant problem with existing batteries occurs if, for any reason, the conventional battery loses power or is discharged. The required source for electrical power to start or operate the vehicle or device is lost. Similarly, if, for instance, automobile lights are accidentally left on for extended periods of time without the automobile running, discharge of the battery is inevitable. Additionally, if other auxiliary equipment, such as a radio, fan, or the like, is left on without the engine running, similar problems can occur. A further way the electrical system of a vehicle might fail is through shorts or bad connections to the battery, so that the battery does not recharge during use. This may also occur when a recharging mechanism, such as an alternator or generator, is non-functioning. These are just some of the types of problems or discharge scenarios that may occur in which failure or discharge of the battery leaves the vehicle helpless.

One way to provide power back to the battery in the case of a discharge scenario is through a jump-start. However, this requires an additional vehicle or battery, which may not be available. Jump-starting also subjects both the discharged battery and the jump-starting battery to potential damage, even the possibility of a catastrophic explosion if the electrical connections are improperly coupled. There are also commercially available alternatives to vehicle-to-vehicle jump-starting. These devices primarily comprise portable auxiliary power sources for jump-starting a discharged battery. A major drawback of these devices is that they require the electrical system of the vehicle to be in operable condition to restore the battery. Most of these portable emergency batteries typically comprise a small reserve battery which is plugged into the electrical system of an automobile, for example, through the cigarette lighter plug, and can only be recharged in a household outlet. Because it cannot be recharged from the vehicle, if the discharge recurs for any reason, the user is potentially stranded. These systems, together with the conventional methods of jump-starting a battery, currently provide the only commercially available ways to overcome the loss of power in a battery or other discharge scenario.

Several attempts at improving the functionality of batteries in discharge scenarios by utilizing auxiliary batteries to forestall the need for jump-starting have been attempted, but none have met with any commercial success. These previous commercial attempts at dual battery systems have proven unreliable and cumbersome or worse, non-functional. Many significant drawbacks are seen in many of the early systems, requiring costly modifications due to non-standard battery sizes, modifications to the battery terminals, and/or modification to the electrical system of the vehicle or the device. These modifications made these systems costly to implement and less reliable than the standard sized batteries. Examples of these early attempts include U.S. Pat. No. 3,200,014 to Roberts and U.S. Pat. No. 3,029,301 to Strider.

Another example of these early systems included a three-post system from DELCO. The battery housing had three external terminals extending from the cover: a main battery positive terminal, a reserve battery positive terminal, and a common negative terminal. The negative terminal electrodes of each battery in the system were purportedly connected through a link in the battery housing cover assembly. Thus, this vehicle electrical system required three cables to accommodate the system and required an additional solenoid that was activated during starting. This non-standard configuration meant additional costs and headache for the end-user, requiring special three post batteries and cables. This and the added costs from the need for additional electrical components made the devices commercially unsuccessful.

Additional attempts at achieving a commercially successful system have been made that would fit standard electrical cable configurations, but these have also failed. Vehicle battery systems, like those shown in U.S. Pat. No. 5,002,840 to Klebenow et al. ("the '840 patent") and U.S. Pat. No. 5,162, 164 to Dougherty et al. ("the '164 patent"), show a main and a reserve unit, separated simply by a one-way diode for maintaining the reserve unit in the charged condition during non-use. The main and reserve batteries of the '840 and '164 patents are coupled in parallel with a diode and resistor therebetween and would require only the standard two-post battery configuration. In a normal operating mode, a resistor (for instance, a variable resistance, positive temperature coefficient resistor) precedes the one-way diode. The variable or positive coefficient resistor steps down the amperage to limit the amount of current and, hence, the amount of heat generated by the diode. The diode prevents the reserve battery from discharging to the main battery while allowing current to reach the battery, but it is limited to providing a trickle charge to the reserve battery for recharging. A shunt is provided that is engaged in discharge scenarios to effectively bypass the resistor and diode, and put the two battery units in parallel without the diode, and thereby engage the reserve battery. The entire system is coupled through the negative terminals of each battery that are brought into contact in the parallel circuit.

These circuits and battery configurations have several disadvantages. The diodes described in the '840 and '164 patents are low capacity diodes. These low capacity diodes are problematic in that they have a limited current carrying capacity. Since the low capacity diodes have a relatively small current carrying capacity, they may be destroyed if excessive current is driven through them. For instance, if the full current capacity of a vehicle electrical system were driven through the diode alone, the diode would be destroyed. Thus, these systems need to step down the current with a resistor; however, such stepdown limits the amount of current used to charge the reserve battery. Therefore, these devices and other devices like them are limited to charging the reserve battery with a low current or trickle charge, taking a significant amount of time to recharge the reserve battery. The long duration to charge the reserve battery is a significant disadvantage of such devices in discharge scenarios.

Moreover, the engagement of the shunt in the circuit as described dumps the discharged battery into parallel with the charged battery. The charged reserve battery thus has to contend with both the load placed on it by the vehicle or device and the load of the discharged main battery. Operator error can cause additional problems. If the switch or shunt is inadvertently left in the bypass mode or if an undetected fault occurs in the battery or electrical system, the reserve unit will discharge along with the main unit, thereby impairing the ability of the reserve unit to function as an auxiliary starting battery.

Thus, in a discharge scenario, the devices of the '840 and '164 patents would put added stress on the reserve battery and, potentially, require a long cycle time to recharge the reserve electrical power stored therein. This would be an especially grave problem if the vehicle were to have a short or other electrical system failure, severely limiting the operating time of the vehicle on just the reserve battery.

Similarly, U.S. Pat. No. 5,256,502 to Kump ("the '502 patent") discloses a set of plates and plate frames, movable bus bars, and circuitry components, including a diode in the circuitry, that allow for recharging of a reserve battery defined from the set of plates and engaged by a switch. The diode prevents current from being drawn from the reserve battery unless a switch is turned to a reserve setting. Similar to the '840 and '164 patents, when the reserve battery plates are selectively engaged, the main and reserve batteries are configured in parallel with each other upon engagement of the switch. Thus, this solution has the same problems as the solutions of the '840 and '164 patents, and similarly couples the negative terminals of the two batteries. The reserve battery is saddled with the load of the electrical system and the load of the discharged main battery when trying to start from a discharge scenario, as engagement draws the reserve electrical energy in the system down. There is no suggestion in any of the aforementioned references of any way to overcome this problem and, in the case of the '502 patent, there is no way to electrically isolate the reserve battery as it is composed of plates shared with the main battery.

In U.S. Pat. No. 6,121,750 to Hwa ("the '750 patent"), a two part battery is disclosed having a microprocessor control switch. The Hwa device contains two twelve-volt batteries in a single housing sharing a common negative terminal end and a single positive terminal. The secondary battery is provided for intermittent engagement to fulfill requirements for short duration, high current output situations. A switch box is provided to permit switching from just the main battery to engaging the main and secondary batteries. Again, the batteries are in parallel when engaged and would be poorly equipped to deal with a discharge scenario for reasons similar to those previously discussed in regards to the other references. Furthermore, there is no indication or suggestion of a diode or similar device provided in the circuitry of the '750 patent for charging the secondary battery and, thus, the secondary battery is not necessarily kept in a charged state because the secondary battery is only providing additional cranking power.

U.S. Pat. No. 5,683,827 to Yu discloses a silicon controlled rectifier for automatically switching off the battery pack when the battery pack generates an output voltage lower than a threshold voltage during a discharge cycle. The rectifier is coupled with individual cells in a series of cells that comprise a battery pack. The system switches packs, but does not provide for reserve electrical energy beyond the individual cells. Moreover, the switching does not teach or suggest an auxiliary battery, nor does it teach isolating an auxiliary battery in case of a discharge scenario.

The performance of all of the heretofore known multiple battery systems have been unsatisfactory. Even with the existing attempts to provide readily available reserve power in a battery, there is still significant room for improvement and a need for emergency starting power. Prior attempts required retrofitting vehicles to accommodate different sized battery housings, different terminal configurations, or remote circuitry, which is often cost prohibitive. To date, no system has been developed to provide the reserve power that is necessary to operate a vehicle or piece of equipment in an emergency and be sufficiently reliable in all situations.

The known multiple battery configurations do not permit disposition of at least two batteries, each capable of delivering sufficient power to start and operate a vehicle, within a housing defined by a conventional vehicle battery envelope and having terminal locations designed to accommodate conventional cable configurations. No system is available that provides the full current of the electrical system of the vehicle to immediately begin recharging an auxiliary battery. In fact, the reliability and safety of previously attempted systems is hampered by diodes with insufficient current-carrying capacity, which may be destroyed during recharge. Additionally, none of the previous devices has been able to provide both a one-way charging circuit and, when needed, the ability to isolate the auxiliary battery to provide emergency power. Finally, none of the prior devices can provide a method for determining whether the cause of the main battery discharge is in the electrical system of the vehicle and still provide the auxiliary power necessary in this situation to get assistance.

BRIEF SUMMARY OF THE INVENTION

Generally, the present invention encompasses a multiple battery system for reliably supplying electrical energy to an electrical system. In one embodiment, the multiple battery system includes a battery housing, first (e.g., main) and second (e.g., auxiliary or standby) batteries disposed in the battery housing, a one-way charging circuit, and at least one switching device. The battery housing includes at least one positive terminal and at least one negative terminal. The positive terminal(s) and the negative terminal(s) are electrically coupleable to the electrical system. Each battery includes a respective positive output and a respective negative output. The negative output of each battery is electrically connected to the negative terminal(s) of the battery housing. In an alternative embodiment, two or more standby, backup or reserve batteries may be employed.

The one-way charging circuit is electrically connected between the positive output of the first battery and the positive output of the second battery. The one-way charging circuit is configured to facilitate charging of, but prevent current flow from, the second battery at all times during which the first battery is supplying electrical energy to the electrical system. The switching device(s) is operable in at least two states to selectively electrically connect the positive terminal(s) of the battery housing to one of the positive output of the first battery and the positive output of the second battery. In a first state, the switching device(s) is operable to electrically connect the positive output of the first (e.g., main) battery to the positive terminal(s) of the battery housing. In a second state independent of the first state, the switching device(s) is operable to electrically connect the positive output of the second (e.g., standby, reserve or auxiliary) battery to the positive terminal (s) of the battery housing. Due to the isolating action of the switching device and the particular configuration of the multiple battery system, the first battery and the second battery never supply electrical energy to the electrical system simultaneously when the positive terminal(s) and the negative terminal(s) of the battery housing are electrically coupled to the electrical system.

In one non-limiting exemplary embodiment, the battery housing is dimensioned to be a standard twelve volt battery for auto, truck, marine and/or machinery applications meeting the original equipment manufacturer's specifications. For instance, in one non-limiting exemplary embodiment, the multiple battery system includes two twelve-volt batteries in a single battery housing of conventional size and proportion. The main battery and the standby, auxiliary, or backup battery are contained within the housing. Additional embodiments could include modifications to provide six-volt, twenty-four volt, thirty-six volt, forty-eight volt, seventy-two volt and the like main and/or auxiliary batteries. Additional configurations and variations in the number of batteries, voltage of the batteries, numbers of cells, relative power of each cell, and number of compartments containing the cells can be provided to suit a particular application and would not depart from the aspects of the invention.

In a further embodiment, the multiple battery system may have the batteries disposed within a housing characterized by conventional vehicle battery external dimensions and the terminals being disposed to accommodate conventional vehicle cable configurations. The use of a conventional battery-housing envelope facilitates relatively low cost production through the utilization of existing manufacturing equipment and processes. Moreover, such a configuration allows the multiple battery system of the present invention to be substituted for existing vehicular batteries.

In accordance with another exemplary embodiment of the present invention, the cells of the first or main battery are disposed along the longitudinal axis of the battery housing and above the auxiliary cell housing. The cells of the second or auxiliary battery are approximately one-quarter the height of the main cells and are disposed below the main battery. Such a configuration renders the subject battery system interchangeable with a wide range of conventional two-terminal automotive batteries.

In accordance with yet another exemplary embodiment of the present invention, the switching mechanism is disposed within the battery housing cover and includes a manually operable actuator for selecting between the main and reserve batteries.

According to a further embodiment of the present invention, the multiple battery system is configured for disposition within a vehicle for electrical communication with conventional vehicle battery cables. In the event the main battery output is too low to start the vehicle, the operator manipulates the switch to the auxiliary position (second state), thereby bringing the auxiliary battery online, which is maintained in the fully charged state by the one-way charging circuit. Upon starting the vehicle, the operator manipulates the switch back to the normal position (first state), thereby engaging the main battery to operate and recharge from the electrical system and recharging the auxiliary battery from the electrical system through the one-way charging circuit. The main and auxiliary batteries are recharged in the conventional manner during vehicle operation.

Additionally, according to a still further embodiment of the present invention, the power in the auxiliary battery allows the automobile or other vehicle to be operated even when the main battery is discharged or incapacitated. Thus, when the main battery is not usable, the auxiliary battery can be utilized until repair or replacement can be conveniently obtained.

According to yet another embodiment of the present invention, both the primary and the secondary batteries are of sufficient strength such that, under ordinary weather conditions, either will operate the starter and the vehicle without the aid of the other. Thus, if one of the two batteries is totally discharged for some reason, the vehicle will still be operable.

According to yet a further embodiment of the present invention, the main battery is electrically isolated from the auxiliary battery in the second position or state of the switching device.

According to another embodiment of the present invention, the battery housing may also include at least one main battery compartment containing the first or main battery. The battery housing may further include at least one auxiliary battery compartment containing the second or auxiliary battery. Each of the main battery and the auxiliary battery can be one of a six-volt, a twelve-volt, or a twenty-four volt battery. Alternatively, each of the main battery and the auxiliary battery may be a twelve-volt battery having six, two-volt cells.

In a further embodiment of the multiple battery system, only the coupling of the positive output of the main battery and the positive output of at least one auxiliary battery are switched by the switching device. Additionally, the second operating position or state of the switching device isolates the main battery from the electrical system and introduces only the auxiliary battery as the supplier of electrical energy to the electrical system.

In a further embodiment of the present invention, the battery housing may include a main battery compartment containing the main battery and at least one auxiliary battery compartment containing the auxiliary battery or batteries, wherein the main battery compartment is located atop the auxiliary battery compartment(s).

In yet another embodiment of the present invention, the battery housing may include at least one fill tube. Where the main battery and/or the auxiliary battery include more than one cell, a fill tube may be included for each cell of the main battery and/or auxiliary battery. In a further embodiment, the fill tube(s) for the auxiliary battery may pass through the main battery compartment.

In a further embodiment of the present invention, the one-way charging circuit of the multiple battery system may comprise at least one diode. The diode can be a silicon rectifier. The silicon rectifier can have an amperage rating between about 25 and 95 amps. In a still further embodiment, the main battery can be a 12-volt automobile battery and the silicon rectifier can have a 12-volt, 45 amp rating. Additionally, the one-way charging circuit can comprise at least one high capacity diode and at least one heat sink coupled to the high capacity diode(s). The high capacity diode(s) can have an amperage rating between about 25 and 95 amps. Moreover, in yet another exemplary embodiment, the high capacity diode(s) can have a 12-volt, 45 amp rating and the heat sink(s) coupled to the high capacity diode(s) can have sufficient surface area to dissipate the heat generated by a 12-volt, 45 amp high capacity diode.

In yet another embodiment of the present invention, the multiple battery system may include a controller coupled to and controlling a state of the switching device. The multiple battery system may also have at least one sensor in communication with the controller. The sensor(s) can include at least one main battery voltage sensor, at least one main battery current (amperage) sensor, at least one auxiliary battery voltage sensor, at least one switch position sensor, and at least one auxiliary battery current (amperage) sensor. The controller can couple to and communicate with the position sensor to detect the position of the switching device and selectively engage or actuate the switching device based on input from at least one of the main battery voltage sensor, the main battery current sensor, the auxiliary battery voltage sensor, and the auxiliary battery current sensor.

In a further embodiment of the present invention, the multiple battery system can also have an auxiliary battery discharge system. The auxiliary battery discharge system can have a controller with a timer. The timer can signal the controller to periodically change the switch position or state of the switching device so as to temporarily discharge the auxiliary battery for periods of time and then switch back to the first operating position or state to reconnect the main battery. The discharge system may also or alternatively include written instructions describing how to manually switch the switching device to the second operating position for a period of time and then to manually switch the switching device back to the first operating position. The discharge system can also have the controller switch the switching device to couple the auxiliary battery positive output to the electrical system if an input signal from at least one sensor indicates that the main battery voltage or current (amperage) is below a trigger point.

The present invention eliminates the need to jump-start a vehicle or, if the electrical system has failed, allows the user to determine such a failure and try to reach some assistance while operating from the auxiliary battery. The instant invention also eliminates the danger of trying to jump-start an automobile, where there is the potential for electrical sparking and explosion. Additionally, by avoiding the need for a jump-start with the instant invention, both safety and security are improved, as there is no need to leave your vehicle to seek assistance or flag down strangers when the vehicle will not start. Improved time to charge is also an important further advantage of the instant invention. Re-charging a battery with known devices can take significant amounts of time, if it is even possible, for instance in situations where user is stuck on a lonely back road. However, the instant invention allows the user to quickly start his or her vehicle and immediately begin recharging both the main and the auxiliary batteries.

The present invention also provides a multiple battery system that is generally universally installable in place of a conventional battery. Additionally, the multiple battery system provides sufficient reserve electrical power for most, if not all, situations, even in worst-case type discharge scenarios, such as failure in the electrical system. Further, the present invention provides auxiliary power easily and virtually instantaneously. Still further, the multiple battery system is simple in construction, does not require substantial and costly structures or modifications to existing electrical systems, circuitry, or other components, and is economical to manufacture and use. Still further, the present invention facilitates efficient utilization of the available space within conventional battery housing dimensions such that the main battery exceeds SAE recommended minimum cold cranking amperage (CCA) output ratings for most original equipment manufacturer (OEM) vehicles.

DETAILED DESCRIPTION

Figure 1:
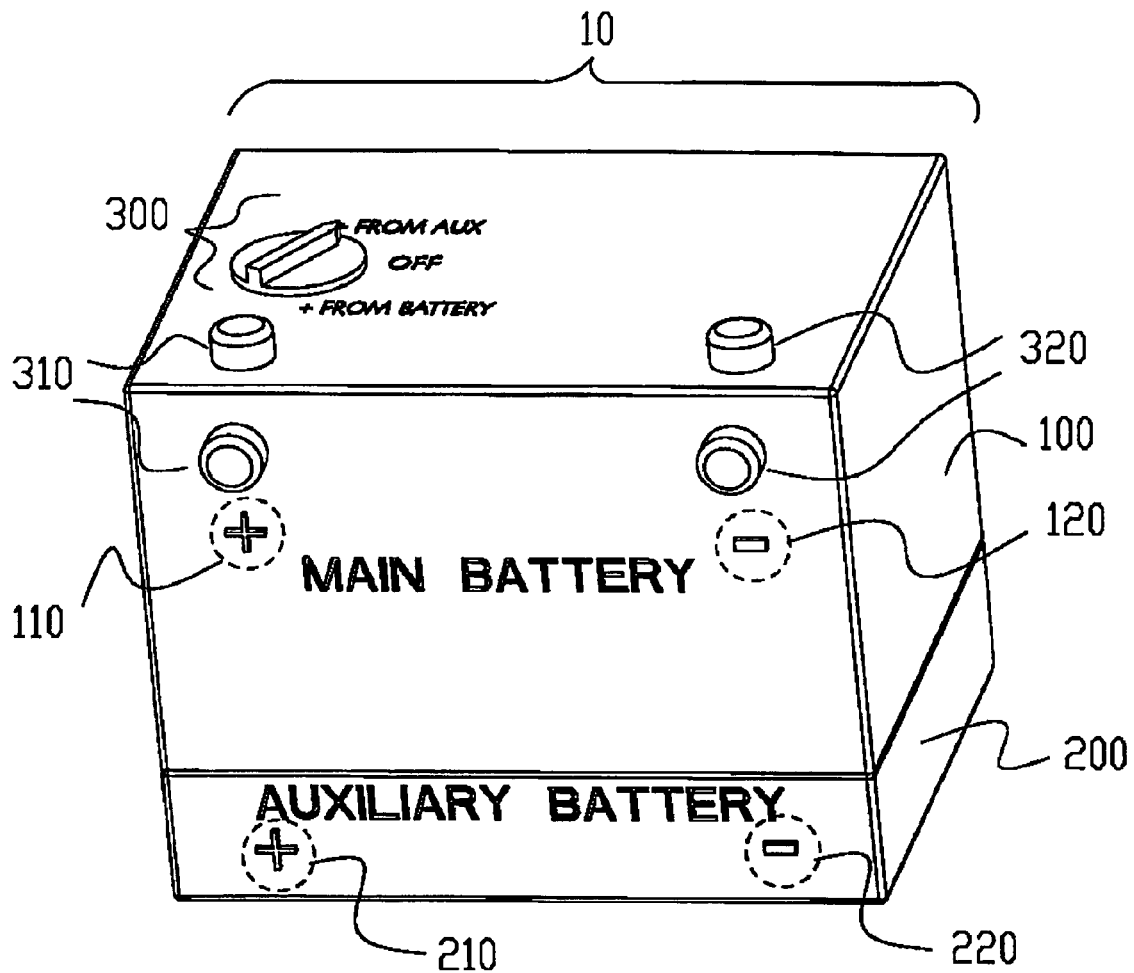
FIG. 1 shows an isometric view of an exemplary embodiment of a multiple battery system in accordance with one embodiment of the instant invention.

In the drawings, depicted elements are not necessarily drawn to scale and like or similar elements are designated by like reference numerals throughout the several figures.

FIG. 1 shows an isometric view of an exemplary embodiment of the instant invention. In the exemplary embodiment shown in FIG. 1, as well as in FIGS. 2-5, the upper portion of the battery housing 10 contains the main battery 100 while the lower portion of the battery housing 10 comprises the auxiliary battery 200. In the exemplary embodiment shown, the main battery 100 accounts for about three-quarters and the auxiliary battery 200 accounts for about one-quarter of the battery housing 10. The main battery 100 terminates in a main positive output 110 and main negative output 120. The auxiliary battery terminates in a second or auxiliary positive output 210 and a second or auxiliary negative output 220.

Thus, the exemplary embodiment shown provides two positive outputs and two negative outputs internal to the battery housing for each battery.

In the exemplary embodiment of FIG. 1, at least one common positive post or terminal, in this case a set of common positive posts or terminals 310, and at least one common negative post or terminal, here a set of common negative posts or terminals 320, are electrically coupled to the first 110, 210 and second set 210, 220 of outputs. The positive outputs 110, 210 are selectively coupled through switching device 300, as further described herein below. Additional exemplary embodiments can provide single positive common terminals and single negative common terminals. In the exemplary embodiment of FIG. 1, the coupling of the terminals 310, 320 to the respective outputs is internal to the battery housing 10. This coupling can be done in any suitable manner, for instance, through use of a bus coupling or bus bar or through a wiring connection or similar electrical coupling means. Additional batteries may be added and the coupling of the batteries may be made external or partially external to the battery housing without departing from the spirit of the invention.

As depicted in the exemplary embodiment shown in FIG. 1, the common negative and positive terminals or posts 310, 320 protrude from the top and side of the external battery housing so as to be external to the battery housing 10 and easily coupled to electrical connectors extending from the electrical system (not shown). This configuration accommodates the electrical connectors for common vehicle and equipment electrical systems. Variation in the placement, the number and the type of possible posts or connections can be provided without departing from the inventive aspects of the instant invention. One non-limiting example of such a variation would be an exemplary embodiment providing internal connections to the common terminals for systems and vehicles in harsh environments.

The main positive output 110 and auxiliary positive output 210 are coupled to a switching device 300, which in turn selectively electrically couples, in various operating positions or states, the batteries 100, 200 and their respective positive outputs 110, 210 to the common positive terminal 310 based on various operating conditions and switch positions. Each operating position corresponds to different circuit configurations for coupling the main battery positive output 110 and the auxiliary battery positive output 210 to the common positive output post or terminal 310.

In the exemplary embodiment shown in FIGS. 1-5, switching device 300 is included in the housing. It selectively electrically couples the main battery 100 or the auxiliary battery 200 to the electrical system (e.g., of a vehicle). Additional embodiments can vary the number of operating positions or states, or location and placement of the switching device 300. For instance, in additional exemplary embodiments, the switching device 300 may be included with an attachment or separate housing containing the circuitry and the auxiliary battery 200, as discussed further in relation to FIGS. 6 and 7 herein below. Furthermore, for the sake of brevity in this description, reference is made to a three-position switching device 300 having first 350, second 360, and tertiary 370 switch positions. The relative number and position of the switch positions as shown can be changed or varied without departing from the inventive aspects of the system. Additionally, the switching of the switching device 300 may be automated through a control mechanism or circuit that senses the condition of the battery system, as further discussed in relation to FIG. 8 herein below. Moreover, a periodic discharge system for the multiple battery system of the instant invention can also be added, as further described below in relation to FIGS. 9 and 10.

In the exemplary embodiment shown with the three-position switching device 300, the switching device 300 has a first or normal operating mode or position 350. In this position the vehicle or equipment operates off the main battery 100 which is always receiving a charge from the electrical power system of the vehicle or equipment when it is running and charging the auxiliary battery 200, as further described in relation to FIGS. 3A and 3B below. The switching device 300 would have a secondary or auxiliary position or operating mode 360, wherein the auxiliary battery 200 would be engaged as the sole source of electrical energy for the vehicle or device, as further described in relation to FIGS. 4A and 4B below. The second or auxiliary switch operating mode or position 360 would be used for emergency back up when needed to start and/or operate the vehicle when the main battery 100 is incapable of starting or operating the vehicle, equipment, or machinery or when discharge cycling the auxiliary battery 200, as discussed below. Finally, a tertiary or storage operating mode or position 370 would be provided wherein the switching device 300 would disconnect both the main battery positive output 110 and the auxiliary battery positive output 210 from the common positive terminal 310 when not in use.

Figure 2A:
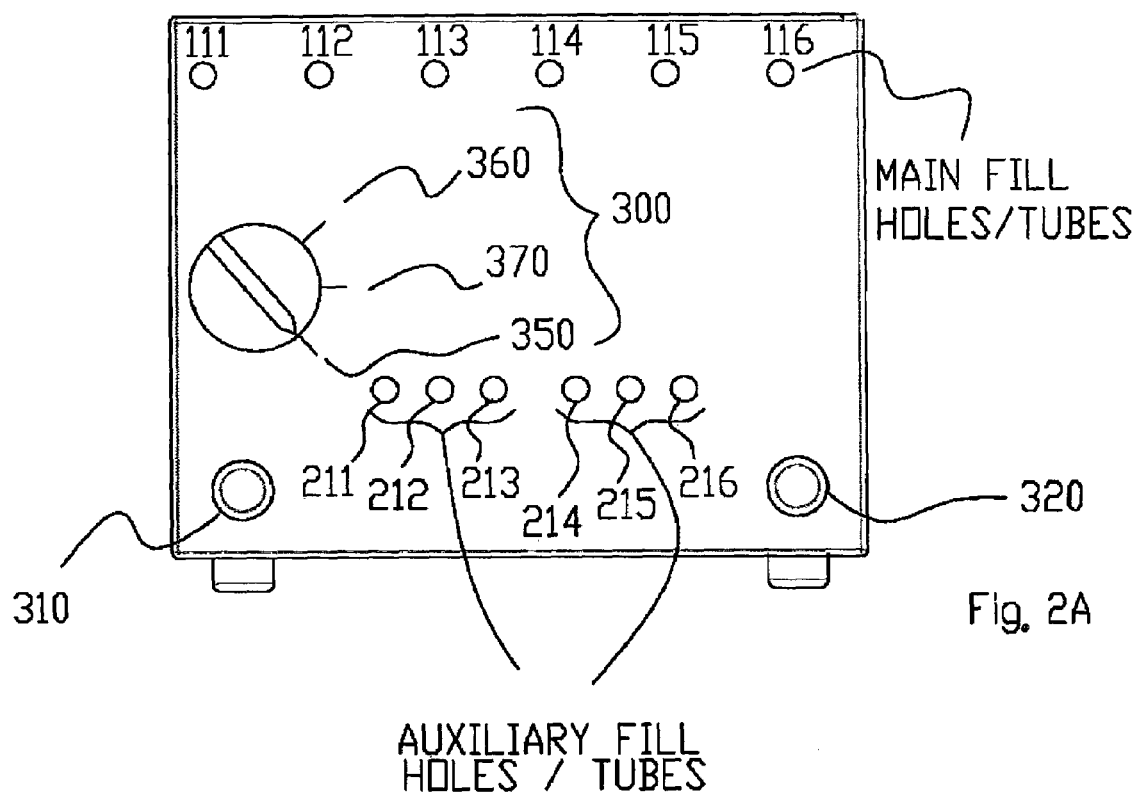
FIGS. 2A and 2B show a top view and a cross-sectional view, respectively, of an exemplary embodiment of a multiple battery system in accordance with another embodiment of the instant invention.
Figure 2B:
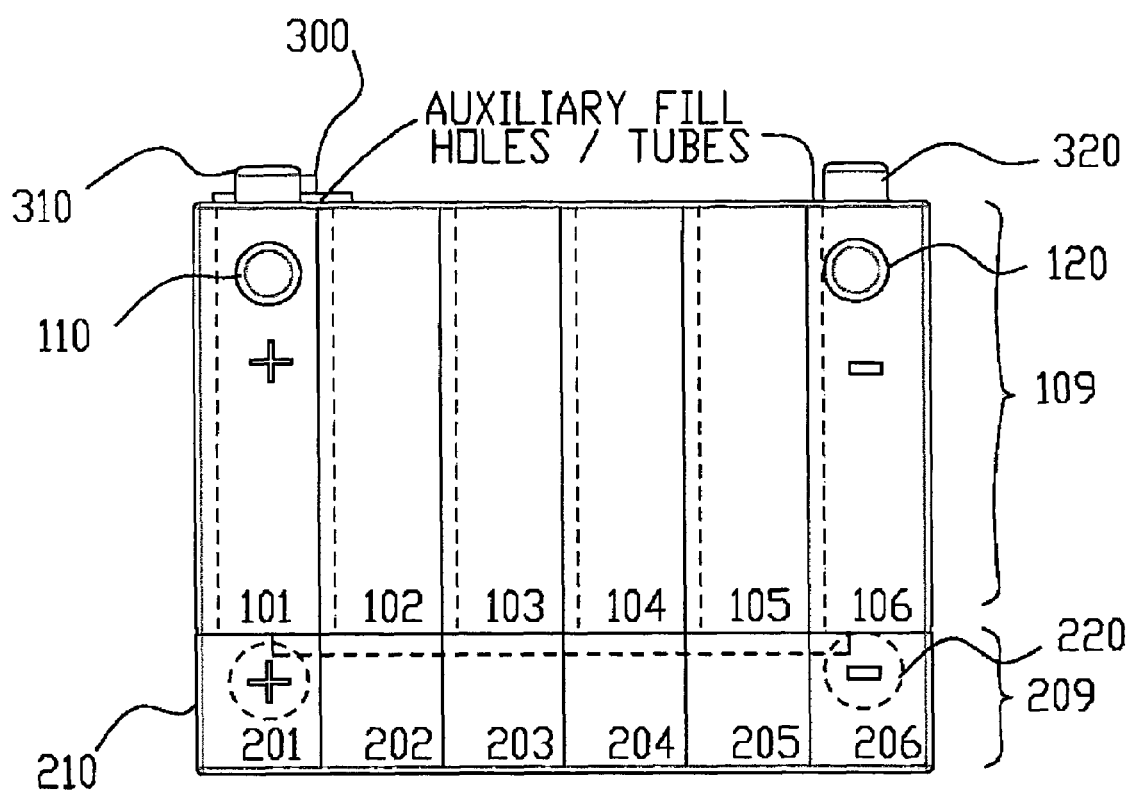

FIGS. 2A and 2B show a top view and a cross-sectional view, respectively, of an exemplary embodiment of the instant invention. In the exemplary embodiment depicted, each of the batteries is comprised of sets of cells contained within a main compartment 109 and an auxiliary compartment 209, respectively. The main battery compartment 109 and auxiliary battery compartment 209 are located one above the other; however, the relative position of each compartment can be varied. The first set of six two-volt main cells 101-106 is coupled in series to form the main battery 100. The second set of six two-volt cells 201-206 is also coupled in series to form the standby, auxiliary, or backup battery 200. The first set of six main cells 101-106 that form main battery 100 terminate at main positive output 110 and main negative output 120. Similarly, the second set of six auxiliary cells 201-206 that form the auxiliary battery 100 terminate at auxiliary positive output 210 and auxiliary negative output 220.

To maintain the electrolytic fluid levels of the main battery 100 and the individual cells 101-106, at least one thin channel or tube (tubes 111-116 as shown) is provided to the main battery 100 or each of the individual cells 101-106 of the main battery 100. Similarly, to maintain the electrolytic fluid levels of the auxiliary battery 200 and the individual cells 201-206, at least one thin channel or tube (tubes 211-216 as depicted) drop between the individual main cells 101-106 of the main battery 100 to act as fill tubes for the electrolytic fluid and act as a vent. The fill tubes or channels can be varied in both number and length to suit particular space and manufacturing constraints, but permit the venting of gasses and the maintenance of electrolytic fluid levels. Additionally the fill tubes or channels may be capped or uncapped, as is known in the art.

Figure 3B:
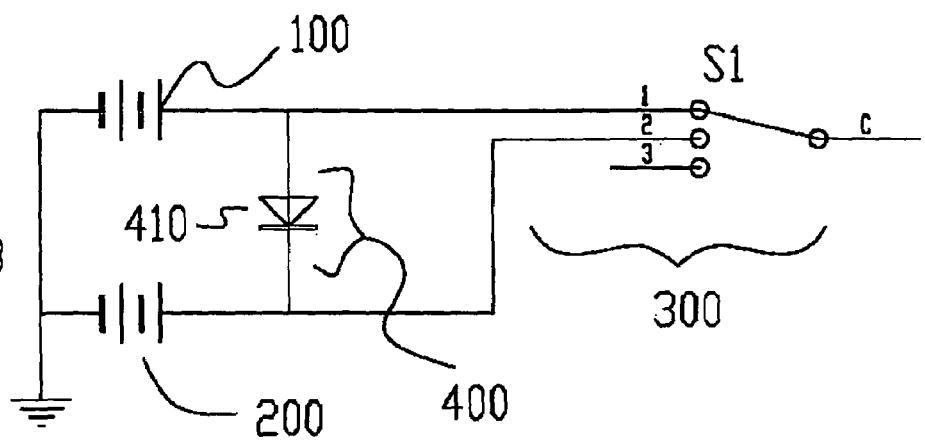
FIGS. 3A and 3B show a top view and a circuit diagram, respectively, of an exemplary embodiment of the multiple battery system of FIG. 1 in a normal operational mode.
Figure 3A:
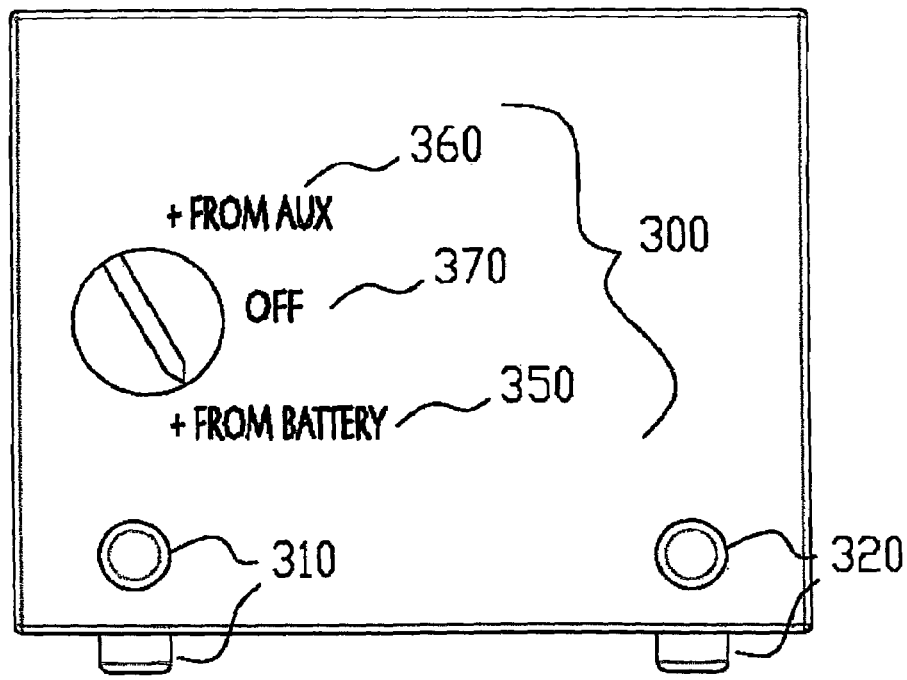

FIGS. 3A and 3B show a top view and a circuit diagram, respectively, of an exemplary embodiment of the instant invention in a normal operational mode. FIG. 3A shows the switching device 300 in a first switch position 350. In this first, main, or normal switch position or mode 350, indicated in the circuit diagram of FIG. 3B at switch position S1, the main battery 100 is electrically coupled to the electrical system and the auxiliary battery is electrically coupled to the electrical system through the one-way charging circuit 400. The electrical system (not shown) is coupled to common positive post 310, which in turn is coupled to the switching device 300. The switching device 300, when in the S1 position or normal operating mode 350, couples the main positive output 110 and, through the one-way charging circuit 400, the auxiliary positive output 210 to the common positive post 310 and, thereby, the electrical system (not shown). Both the main negative output 120 and the auxiliary negative output 220 are coupled to the negative output post or terminal 320, which is coupled back to the electrical system (not shown) to complete the connection.

The two batteries are coupled by a one-way charging circuit 400 that precedes the auxiliary battery 200, as indicated in the circuit diagram of FIG. 3B. The one-way charging circuit 400 is a one-way circuit allowing for electricity to pass from the electrical system (not shown) to replenish the auxiliary battery 200. As the electrical system (not shown) is providing the current needed to run all the auxiliary equipment, it is simultaneously, through the one-way charging circuit 400, also providing a full charging voltage to the backup or auxiliary or standby battery 200, as well as preventing any discharge from the backup or auxiliary battery 200. Effectively, the one way charging circuit 400 is a one-way electrical "valve" permitting electricity to flow in one direction into the auxiliary battery 200 in the main or first switch position 350.

The one-way charging circuit 400 provides the full current to the auxiliary battery 200 for charging. This is a significant departure from prior systems that disclosed variable coefficient resistors and the like in series with low capacity diodes, as these prior systems could only provide a very small amount of power to the respective standby or reserve battery. Unlike the prior designs that slow the charging current to a trickle charge, the instant invention utilizes a charging circuit that allows for the full current flow to both the main and auxiliary batteries simultaneously to allow for a speedy recovery of both batteries. This does not, however, limit the device from incorporating current regulating components to vary the amount of charge in the circuit, through the charging circuit, or to either of the batteries.

One exemplary embodiment of the one-way charging circuit 400 is a circuit that includes at least one one-way charging diode 410. The one-way charging diode 410 can be, in an exemplary embodiment, but is not limited to, at least one silicon rectifier. Use of a silicon rectifier as the one one-way charging diode 410 would allow for the full current provided by the electrical system of the vehicle to reach the auxiliary battery 200 for recharging, while generating a minimum heat load and preventing the main battery from draining the auxiliary battery 200. The silicon rectifier can be of any amperage and any voltage as dictated by the amperage and voltage of the electrical system of the application. For instance, silicon rectifiers having amperage ratings of between about twenty-five (25) and ninety-five (95) can be used, for example, in twelve-volt auto, light truck and marine systems. A non-limiting example is an exemplary embodiment for conventional twelve-volt automobiles that, for instance, uses a silicon rectifier having a forty-five (45) amp rating as the one-way charging diode 410 as a part of the one-way charging circuit 400.

Additional charging circuit configurations could include, but are not limited to, at least one high capacity one-way diode 410 coupled with at least one high capacity heat sink as the one-way charging circuit 400. As an alternate charging circuit configuration, a combination of high capacity diodes 410 would need to be coupled to a suitable heat sink or similar heat dissipation device that can handle the high amounts of heat generated by the diodes. Having a high capacity diode is critical where higher amounts of heat might be unsafe if the diode is mounted alone or in too close a proximity to the volatile components of a battery. As the amount and rate of heat dissipation is greatly affected by a wide range of parameters associated with the application, the size and placement of the high capacity diode and the heat sink can vary greatly. Various design parameters associated with the diode environment, including, but not limited to, the proximity to plastics and volatile chemicals, the size of the heat sink or sinks, the diode size, the location of the battery, the environment of the battery, and other parameters can be used in determining the size and ratings of the high capacity diode and heat sink combination and placement of the combination within or outside the battery housing.

Figure 4B:
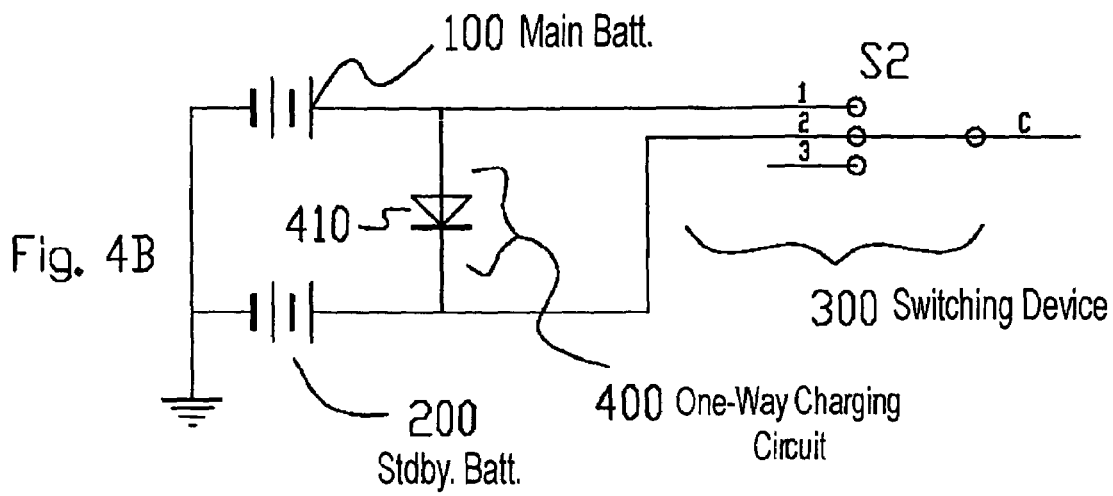
FIGS. 4A and 4B show a top view and a circuit diagram, respectively, of an exemplary embodiment of the multiple battery system of FIG. 1 in an auxiliary operational mode.
Figure 4A:
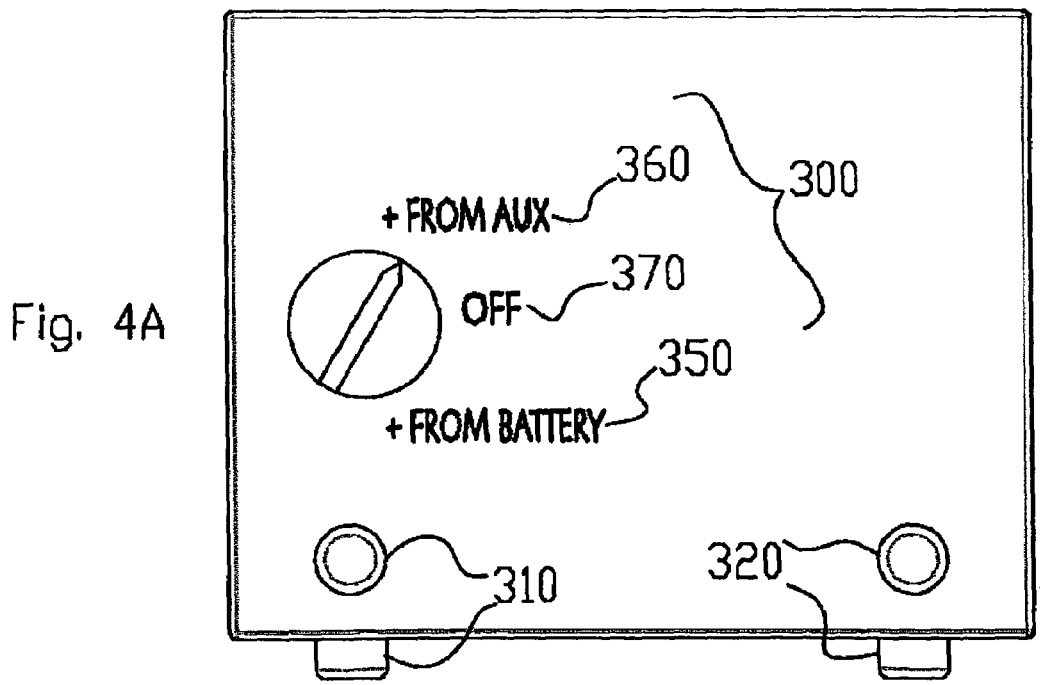

FIGS. 4A and 4B show a top down view and a circuit diagram, respectively, of an exemplary embodiment of the instant invention in an auxiliary operational mode. An operator or a controller manipulates the switching device 300 to the second or auxiliary position or mode 360, represented by switch position S2 in the circuit diagram of FIG. 4B. This electrically couples the common positive terminal 310, and thus the electrical system of the vehicle, to the positive output 210 of the auxiliary battery 200. The connection isolates the auxiliary battery 200 from the main battery 100, as the charging diode 400 prevents electrical current from the electrical system (not shown) from flowing into the main battery 100 while in this operating mode. Again, this circuit is significantly different from previous devices that dump the reserve battery into parallel with the discharged main battery.

Previous attempts at a multi-battery system have all applied a standby battery in parallel with a main battery. The problem with doing this is twofold. First, if there were a short or a dry cell in the main battery, the short circuit would short the backup battery impairing its ability to start the vehicle. Moreover, even if the electrical system and main battery were in good condition, the standby battery of the prior art would be saddled with both the load of the starter and the load of the discharged battery. This weakens the standby battery taking away needed electrical power. By isolating the auxiliary battery 200 from the main battery 100 in the auxiliary mode 360, the invention permits the fully charged auxiliary battery 200 to be used independently to start the vehicle or device. Once started, the operating mode can be manipulated back into the first or main operational position 350 and the full electrical energy of the electrical system of the vehicle can be put into charging both the main battery 100 and the auxiliary battery 200. Additionally, failure to continue operating in the normal operating mode would be an indicator that a short or electrical system failure has occurred, as further described herein below.

Figure 5B:
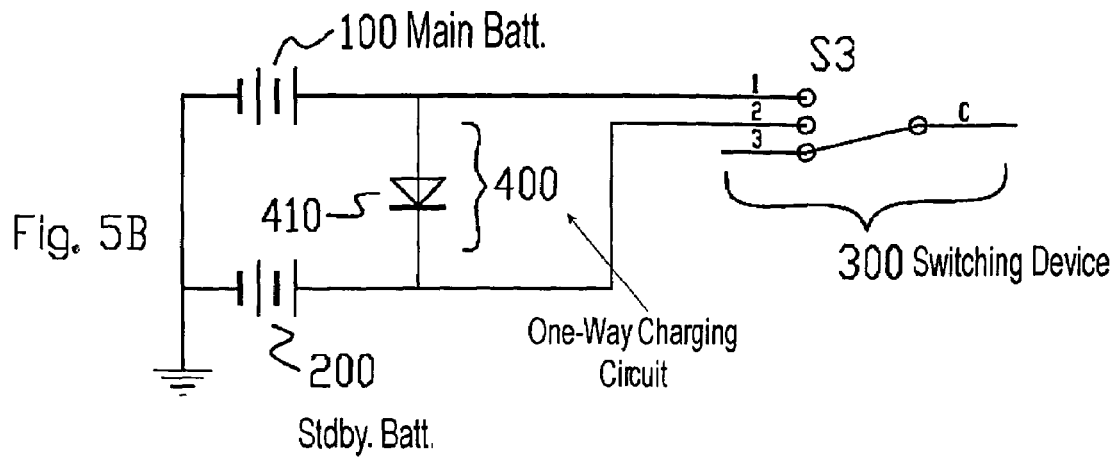
FIGS. 5A and 5B show a top view and a circuit diagram, respectively, of an exemplary embodiment of the multiple battery system of FIG. 1 in a storage operational mode.
Figure 5A:
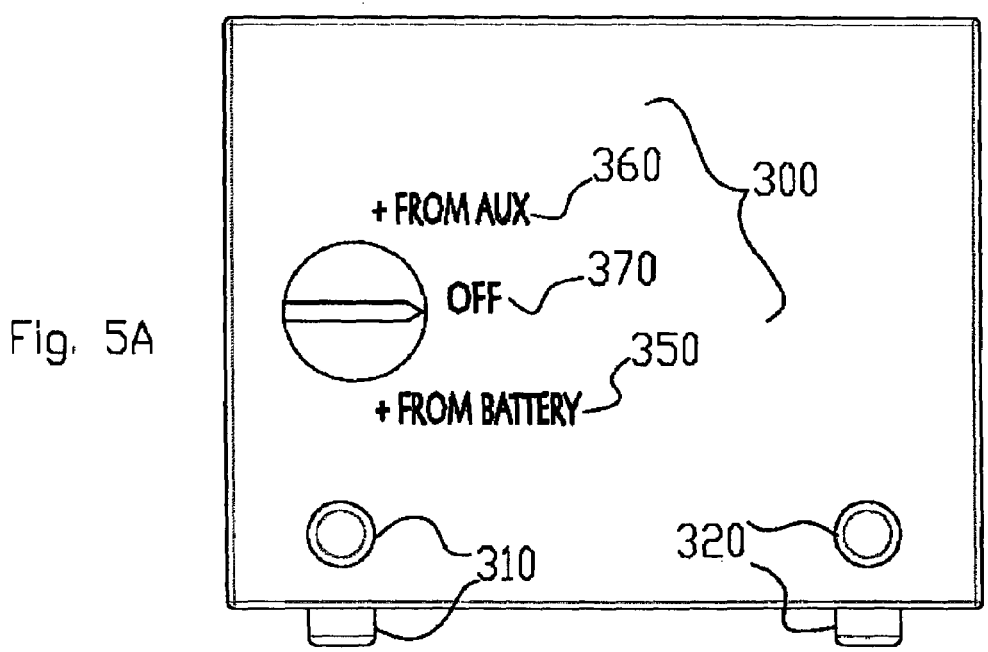

FIGS. 5A and 5B show a top down view and a circuit diagram of an exemplary embodiment of the instant invention in a tertiary or storage operational mode. An operator or controller manipulates the switching device 300 to the tertiary, off, or storage position 370, represented by switch position S3 in the circuit diagram of FIG. 5B. This position provides for disconnection of both batteries for storage. The S3 position disconnects the main positive output 110 and the auxiliary positive output 210 from the common positive terminal 310 and, thereby, the electrical system of the vehicle or equipment. This is useful if the vehicle or equipment is being placed in storage, for instance, or if the battery is being stored.

Figure 6:
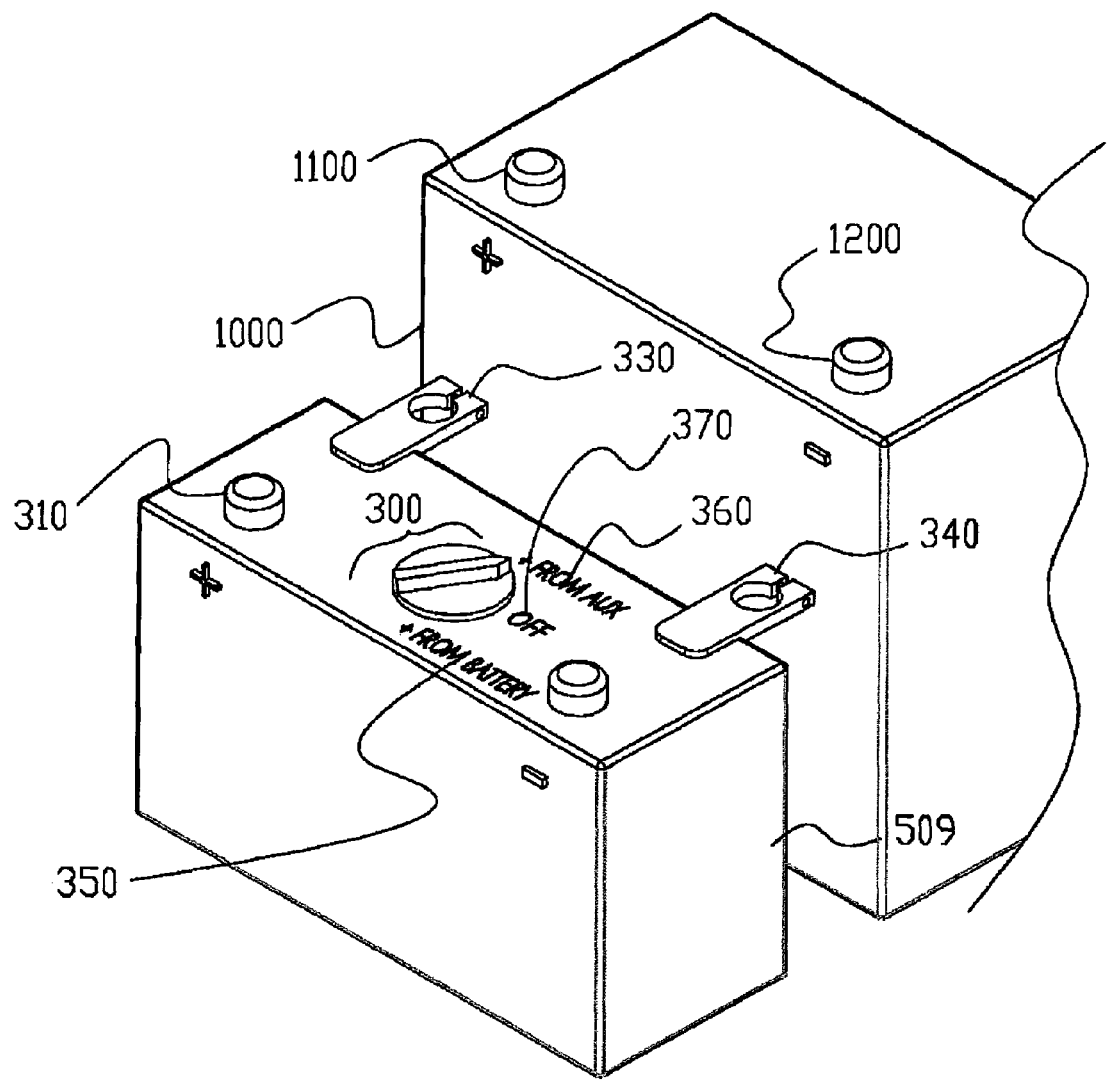
FIGS. 6 and 7 show isometric views of exemplary embodiments of an auxiliary battery attachment system, in accordance with another embodiment of the present invention.
Figure 7:
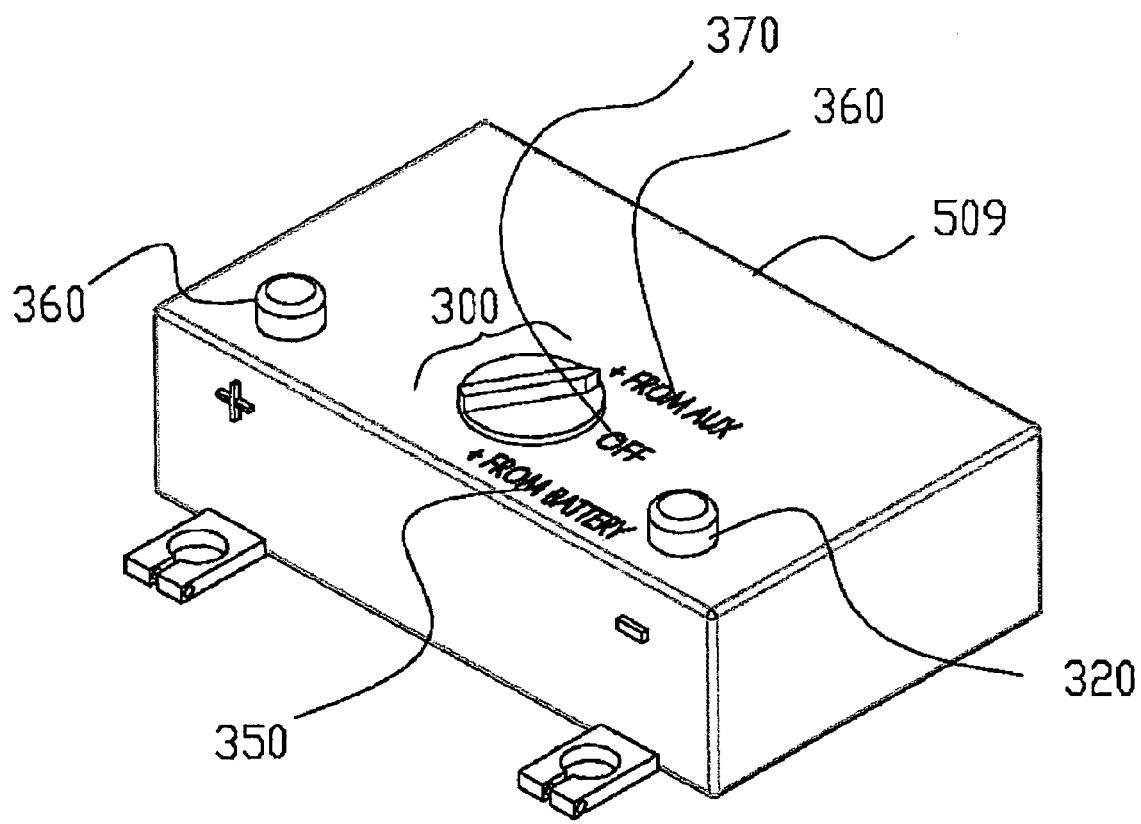

FIGS. 6 and 7 show isometric views of exemplary embodiments of auxiliary battery attachment apparatus in accordance with alternative embodiments of the present invention. In the exemplary embodiment depicted in FIG. 6, the circuitry, switching device 300, and auxiliary battery 200 are provided as a backpack battery attachment system.

The conventional main battery 1000 does not share a common housing with the auxiliary battery 200, but instead the two are coupled through positive coupling 330 and negative coupling 340, and a common circuitry housing 509 that houses the second or auxiliary battery 200. The circuitry housing 509 is hung from the conventional main battery 1000 and its existing positive output 1100 and negative output 1200. This allows application of the invention to existing conventional batteries.

The exemplary embodiment of the attachment device shown in FIG. 6 is coupled to the existing main battery 1000 by disconnecting the electrical leads (not shown) coming from the vehicle or machinery and applying the leads to the common negative terminal 320 and common positive terminal 310 of the exemplary embodiment, located externally on the common circuitry housing 509 in the embodiment depicted. The exemplary embodiments depicted in both FIGS. 6 and 7 have the same switching device 300 as the previously discussed exemplary embodiments, but only six cells comprising the auxiliary battery 200 are enclosed within the circuitry housing 509. Auxiliary battery positive output 210 and auxiliary battery negative output 220 are also enclosed in the circuitry housing and electrically coupled to the common positive terminal 310 and common negative terminal 320, in a manner similar to that discussed above in the previous exemplary embodiments. The circuitry housing 509, the one-way charging circuit 400, and the switching device 300 can be provided to perform all of the same functions of the previously described exemplary embodiments of the instant invention, along with the same variations.

The exemplary embodiment shown includes a similar one-way charging circuit 400, which can include at least one one-way charging diode or rectifier 410 and similar switched circuit configurations with positions S1, S2 and S3, as described in relation to FIGS. 3B, 4B, and 5B. Similar amperage ratings and voltages for various applications can be utilized in the exemplary embodiments of the attachment system. This provides similar functionality from the attachment system embodiments of the instant invention. The positions would include a first, main, or normal operating mode or position 350 in which the vehicle or equipment operates off the main battery 1000, which is always receiving a charge from the electrical system of the vehicle or equipment and charging the auxiliary battery 200; a secondary or auxiliary position 360, where the auxiliary battery 200 would be engaged as the sole source of electrical power for the vehicle or device; and a tertiary or storage position 370. The second or auxiliary switch position 360 would be used for emergency back up when needed to start and/or operate the vehicle when the main battery 1000 is incapable of starting or operating the vehicle, equipment, or machinery. Thus the attachment device would provide a retrofit version of the instant invention, requiring no modification or conversion of existing vehicle or machinery electrical systems, while providing identical performance to the exemplary embodiments of the multiple battery system.

The shape and configuration of the exemplary embodiments of the attachment system can be varied to fit the specific space constraints of various applications. For instance, the further embodiment of FIG. 7 is horizontally oriented so as to sit atop the main battery 1000 rather than hang from the side. The elements of the exemplary embodiment of the attachment device shown in FIG. 7 are similar to the exemplary embodiment of the invention shown in FIG. 6 in that the conventional main battery 1000 does not share a common housing with the auxiliary battery 200, but the two are instead coupled through a common circuitry housing 509 and couplings 330 and 340.

The principal differences being that the auxiliary battery 200 and couplings 330 and 340 sit atop the main battery 1000. Additionally, as mentioned above, the location of common positive and negative terminals 310, 320, the auxiliary outputs 210, 220 and, to the extent that the existing conventional battery may allow, the main battery outputs 1100, 1200, the type of switching device 300 and the voltage rating of the auxiliary battery 200 can be varied without departing from the spirit of the invention.

Figure 8:
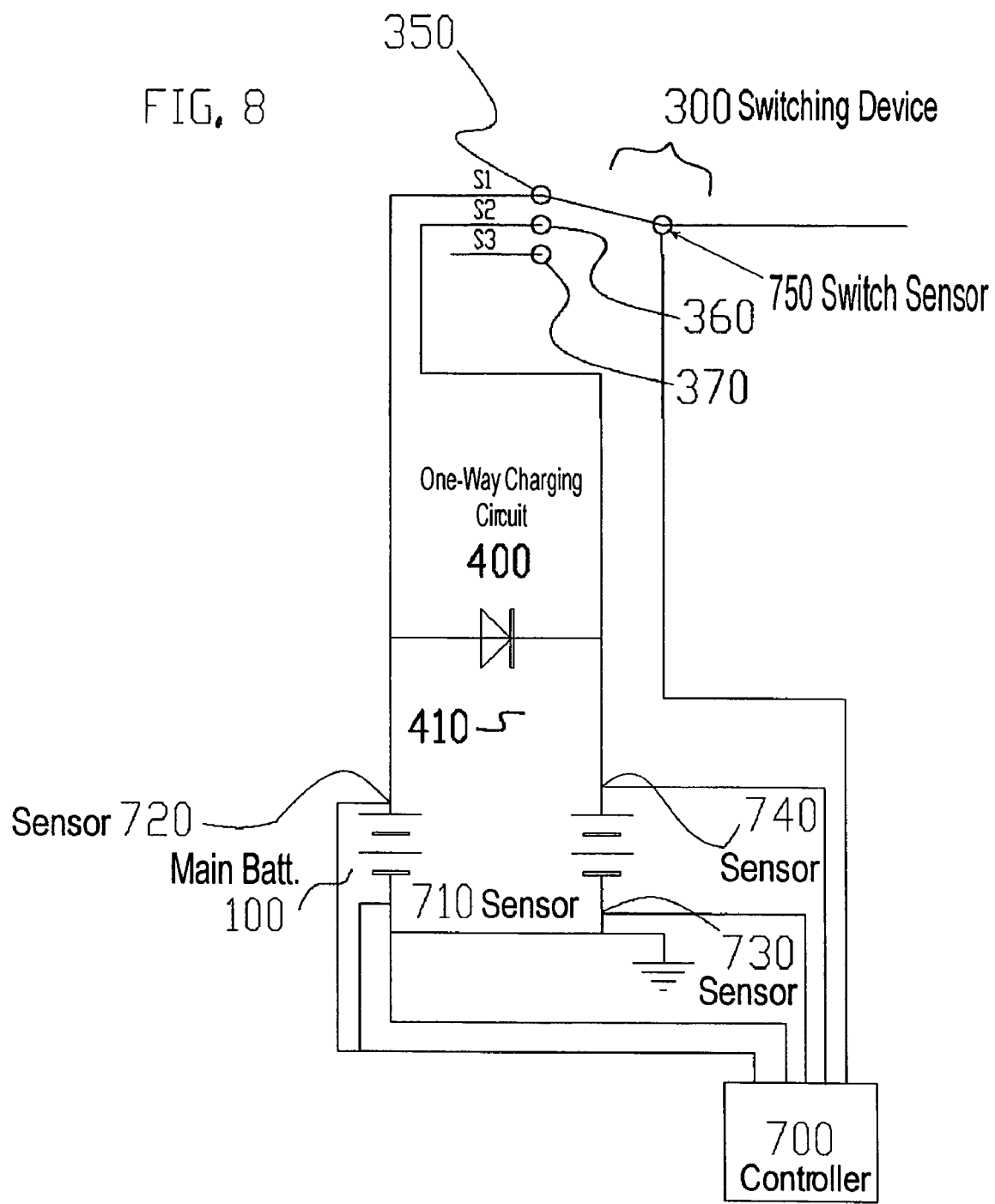
FIG. 8 shows a circuit diagram of a multiple battery system incorporating an automated controller, in accordance with yet another embodiment of the present invention.

FIG. 8 shows a circuit diagram of an exemplary embodiment of the instant invention incorporating an automated controller. In addition to the switching device 300 and circuitry disclosed previously, an additional control system is provided for automated control of the system. A controller 700 is provided, which can for instance be, but is not limited to, a microprocessor. The controller 700 is coupled to at least one sensor in the battery system to sense the condition of each battery through these connections.

The controller 700 monitors and detects various operating conditions of the batteries through at least one sensor. The sensor(s) can include, but is not limited to, any of at least one main battery, auxiliary battery, and switch sensor or any additional sensors. The controller 700 can continuously monitor, for example, but not limited to, any of the following parameters with any of the main, auxiliary, or switch sensors: the auxiliary battery voltage, the main battery voltage, the auxiliary battery current (e.g., cold cranking amperage), the main battery current (e.g., cold cranking amperage), temperature, vibration, current, switch state, switch position, and condition(s) of various flags and various timers within the system. In the exemplary embodiment of FIG. 8, at least one main battery sensor is provided. The main battery sensor(s) is shown as two main battery sensors 710, 720. These measure the voltage of the main battery 100 at main battery sensor 710 and the cold cranking amps of the main battery 100 through main battery sensor 720. Also, in the exemplary embodiment, at least one auxiliary battery sensor is provided. The auxiliary battery sensor(s) is shown as two auxiliary sensors 730, 740. These measure the voltage of the auxiliary battery 200 at auxiliary sensor 730 and the cold cranking amperage of the auxiliary battery 200 through auxiliary sensor 740. Additionally, in the exemplary embodiment of FIG. 8, at least one switch position sensor 750 can be provided to sense the position and condition of the switching device 300.

In each case, the sensors 710-750 communicate with the controller 700 providing various parameter inputs. Upon detecting parameter inputs that match pre-programmed conditions, set through flags, triggers, timers and other common control elements, the controller 700 sends a signal to the switching device 300 to change the state of the switching device 300. The controller 700 then verifies the result of the change of state. The switching sensor 750 is connected to the controller 300 to relay relevant data on the switching device.

Figure 9:
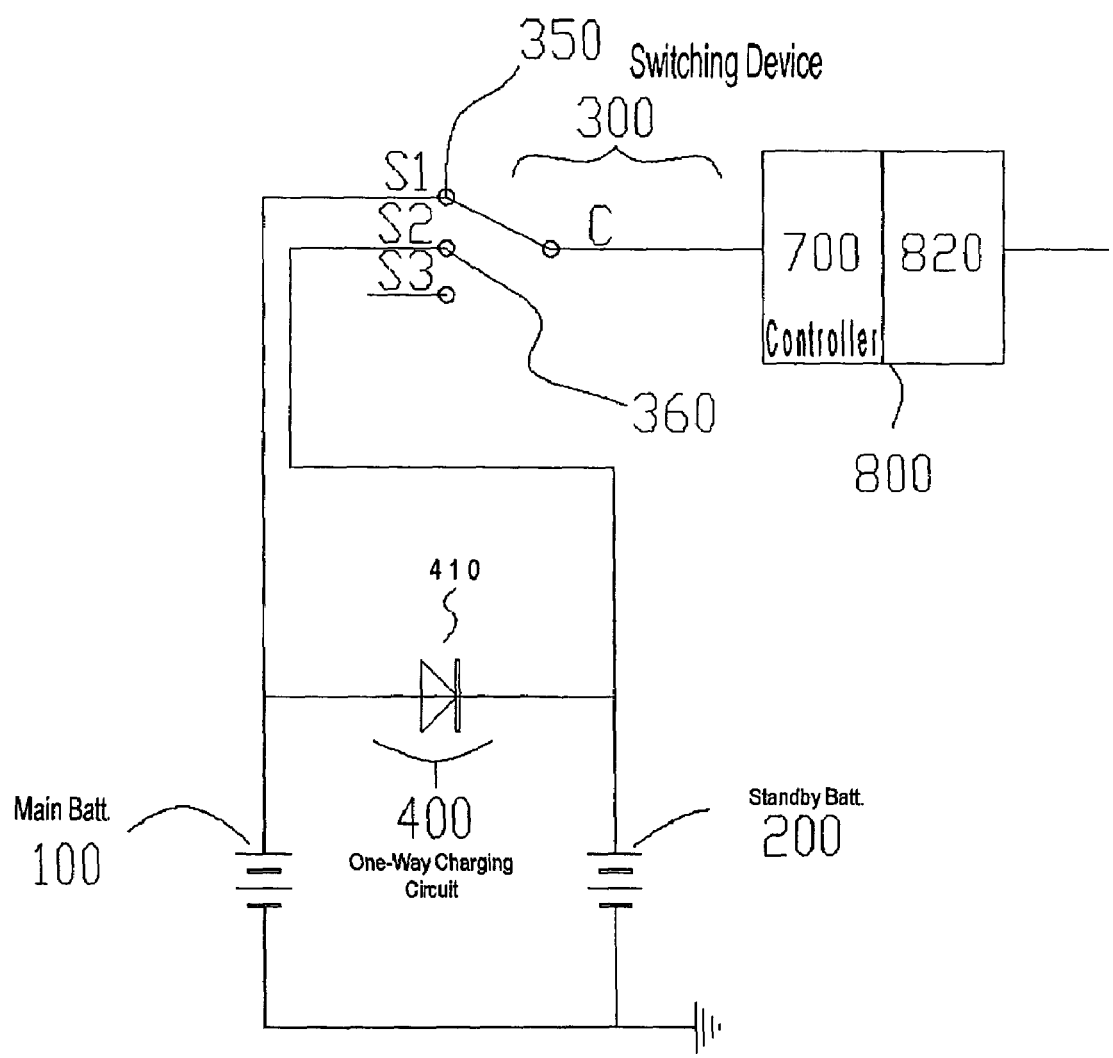
FIG. 9 shows a circuit diagram of an exemplary embodiment of a multiple battery system incorporating an auxiliary battery discharge cycling system, in accordance with a further embodiment of the present invention.
Figure 10:
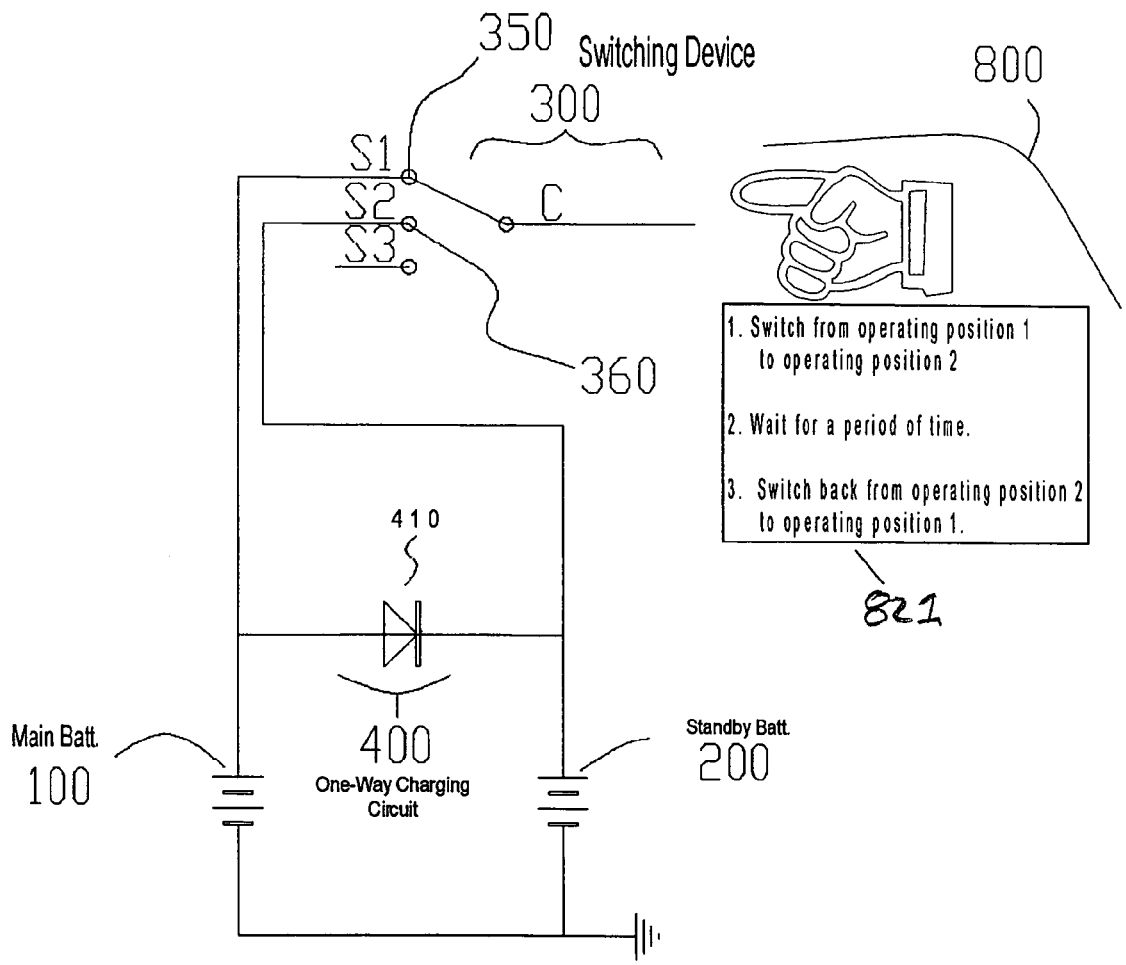
FIG. 10 shows a circuit diagram of an exemplary embodiment of a multiple battery system incorporating a manually operated auxiliary battery discharge cycling system, in accordance with a further embodiment of the present invention.

FIG. 9 shows a circuit diagram for an auxiliary battery discharge cycling system for a still further exemplary embodiment of the instant invention. The still further embodiment of the instant invention is provided that includes an auxiliary battery discharge cycling system 800. This discharge cycling system can, for instance, be included as an automated auxiliary battery discharge cycling system, as shown in the exemplary circuit diagram of FIG. 9. In other non-limiting examples of exemplary embodiments, the discharge cycling system can be incorporated as part of the controller 700 shown in FIG. 8 or as a separate manual discharge unit or through simple instructions to the operator to periodically run the vehicle in the second or auxiliary operational setting in an auxiliary setting for a short period of time, as shown in FIG. 10.

The auxiliary battery discharge cycling system 800 would operate to ensure the longevity of the auxiliary battery 200 by periodically engaging the auxiliary battery 200 to start and/or operate the vehicle or equipment. Such a system can include a timer 820 coupled to a switching device 300, wherein the timer 820 periodically activates the switching device 300, which in turn switches the system to the auxiliary operational mode 360 for a short period of time, as described above in relation to FIGS. 4A and 4B. The system would operate to periodically provide for a slight discharge of the auxiliary battery 200 in the auxiliary-operating mode 350. By providing for a slight discharge, the auxiliary battery 200 would be lower than its peak voltage and would then need to be recharged by the battery system in its first or normal operating mode, as described above. This would help extend the life of the auxiliary battery by maintaining the condition of the electrodes and keeping the electrolytic solution active. Alternatively, as shown in FIG. 10, the auxiliary battery discharge system 800 can incorporate written instructions 821 to an operator to periodically manually switch the multiple battery system from a first operating position to the second operating position for a period of time and then back to the first position. The exemplary embodiments employing the auxiliary battery discharge cycling system 800 in its various forms would only operate for a short period of time so as not to accidentally run down the auxiliary battery 200.

The instant invention may also act as a discharge condition indicator. If an operator were to utilize the auxiliary battery 200 to start the vehicle or machinery, they would switch to the auxiliary circuit position 360 or S2 in the circuit diagrams. Once the vehicle started the user would return the switching device 300 to the normal or main operating position 350, engaging the circuit associated with the normal operating position, in order to charge both batteries to full capacity. If upon returning the switching device 300 to the normal operating position 350 the engine were to stop running, it would indicate a general operating failure in the electrical system (for instance, a bad alternator or generator). At this point the operator would be able to return the switching device 300 to the auxiliary position 360 and engage the auxiliary battery 200 to supply the needed energy to start and run the vehicle or equipment from the auxiliary battery 200 allowing a certain amount of operating time, depending on the application, to obtain service. Thus, the system allows for increased safety for a traveler, giving sufficient time, for instance, to get a car off the road and home or to a service station.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. A multiple battery system for supplying electrical energy to an electrical system, the multiple battery system comprising:
 a battery housing including at least one positive terminal and at least one negative terminal, the at least one positive terminal and the at least one negative terminal being electrically coupleable to the electrical system;
 a first battery disposed within the battery housing, the first battery including a first positive output and a first negative output, the first negative output being electrically connected to the at least one negative terminal;
 a second battery disposed within the battery housing, the second battery including a second positive output and a second negative output, the second negative output being electrically connected to the at least one negative terminal;
 at least one switching device operable in at least two states to selectively electrically connect the at least one positive terminal to one of the first positive output and the second positive output, the at least one switching device being operable in a first state to electrically connect the first positive output to the at least one positive terminal, the at least one switching device being further operable in a second state independent of the first state to electrically connect the second positive output to the at least one positive terminal; and
 a one-way charging circuit electrically connected between the first positive output and the second positive output, the one-way charging circuit being configured to facilitate simultaneous charging of the first battery and the second battery when the at least one switching device is in the first state, the one-way charging circuit being further configured to prevent current flow from the second battery when the at least one switching device is in the first state,
 wherein the first battery and the second battery do not supply electrical energy to the electrical system simultaneously when the at least one switching device is in the first state or when the at least one switching device is in the second state and a voltage of the first battery is less than or equal to a voltage of the second battery.

2. The multiple battery system of claim 1, wherein the first battery is electrically isolated from the second battery when the at least one switching device is in the second state.

3. The multiple battery system of claim 1, wherein the battery housing includes a first compartment containing the first battery.

4. The multiple battery system of claim 3, wherein the battery housing further includes a second battery compartment containing the second battery.

5. The multiple battery system of claim 4, wherein the first compartment is located atop the second compartment.

6. The multiple battery system of claim 1, wherein the battery housing includes at least one fill tube.

7. The multiple battery system of claim 6, wherein the first battery includes at least one cell, wherein the second battery includes at least one cell, and wherein the at least one fill lube includes a fill tube for each cell of the first battery and the second battery.

8. The multiple battery system of claim 6, wherein the at least one fill tube includes a fill tube for the second battery and wherein the fill tube for the second battery passes through a compartment of the battery housing containing the first battery.

9. The multiple battery system of claim 1, wherein the one-way charging circuit comprises at least one diode.

10. The multiple battery system of claim 9, wherein the one-way charging circuit further includes at least one heat sink coupled to the at least one diode.

11. The multiple battery system of claim 1, further comprising a controller coupled to the at least one switching device, the controller controlling whether the at least one switching device is in the first state or the second state.

12. The multiple battery system of claim 11, further comprising at least one sensor in communication with the controller, the at least one sensor sensing at least one operating condition of the first battery and the second battery.

13. The multiple battery system of claim 12, wherein the at least one operating condition of the first battery and the second battery includes at least one of a voltage of the first battery, a voltage of the second battery, a cold cranking amperage of the first battery, and a cold cranking amperage of the second battery.

14. The multiple battery system of claim 12, wherein the at least one sensor further senses a state of the at least one switching device.

15. The multiple battery system of claim 12, wherein the first state of the at least one switching device is a first physical switch position and wherein the second state of the at least one switching device is a second physical switch position, and wherein the at least one sensor further senses a physical switch position of the at least one switching device.

16. The multiple battery system of claim 12, wherein the controller selectively changes a state of the at least one switching device based on the at least one operating condition and a present state of the at least one switching device.

17. The multiple battery system of claim 16, wherein the controller changes the state of the at least one switching device to the second state responsive to an input signal from the at least one sensor indicating that at least one of a voltage and a cold cranking amperage of the first battery is below a respective trigger point.

18. The multiple battery system of claim 1, further comprising a battery discharge system for temporarily discharging the second battery when the first battery is in a charged condition.

19. The multiple battery system of claim 18, wherein the battery discharge system comprises a controller and a timer.

20. The multiple battery system of claim 19, wherein the timer signals the controller to set a state of the at least one switching device to the second state so as to discharge the second battery for a predetermined period of time and, after expiration of the predetermined period of time, signals the controller to set the state of the at least one switching device to the first state.

21. A multiple battery system for supplying electrical energy to an electrical system, the multiple battery system comprising:
- a battery housing including at least one positive terminal and at least one negative terminal, the at least one positive terminal and the at least one negative terminal being electrically coupleable to the electrical system;
- a first battery disposed within the battery housing, the first battery including a first positive output and a first negative output, the first negative output being electrically connected to the at least one negative terminal;
- a least a second battery disposed within the battery housing, the at least a second battery including at least a second positive output and at least a second negative output, the second negative output being electrically connected to the at least one negative terminal;
- at least one switching device operable in at least two states to selectively electrically connect the at least one positive terminal to one of the first positive output and the at least a second positive output, the at least one switching device being operable in a first state to electrically connect the first positive output to the at least one positive terminal, the at least one switching device being further operable in at least a second state independent of the first state to electrically connect the at least a second positive output to the at least one positive terminal; and
- a one-way charging circuit electrically connected between the first positive output and the at least a second positive output. the one-way charging circuit being configured to facilitate simultaneous charging of the first battery and the second battery when the at least one switching device is in the first state, the one-way charging circuit being further configured to prevent current flow from the second battery when the at least one switching device is in the first state,
- wherein the first battery and the at least a second battery do not supply electrical energy to the electrical system simultaneously when the at least one switching device is in the first state or when the at least one switching device is in the second state and a voltage of the first battery is less than or equal to a voltage of the second battery.

* * * * *